(12) United States Patent
Ford

(10) Patent No.: US 6,317,530 B1
(45) Date of Patent: Nov. 13, 2001

(54) MICRO-OPTO MECHANICAL MULTISTAGE INTERCONNECTION SWITCH

(75) Inventor: Joseph E. Ford, Oakhurst, NJ (US)

(73) Assignee: Lucent Technologies, Murray Hill, NJ (US)

( * ) Notice: Subject to any disclaimer, the term of this patent is extended or adjusted under 35 U.S.C. 154(b) by 0 days.

(21) Appl. No.: 09/221,881

(22) Filed: Dec. 28, 1998

(51) Int. Cl.[7] .................. G02B 6/26; G02B 6/42
(52) U.S. Cl. ............... 385/17; 385/18; 359/212; 359/850; 359/855; 359/856; 359/857; 359/862
(58) Field of Search ............. 385/16–23; 359/290–292, 359/846, 212, 213, 221, 220, 850, 855, 856, 857, 862, 864, 865

(56) References Cited

U.S. PATENT DOCUMENTS

| | | | |
|---|---|---|---|
| 5,841,917 | * 11/1998 | Jungerman et al. | 385/17 |
| 5,872,878 | * 2/1999 | Bergmann | 385/15 |
| 6,144,781 | * 11/2000 | Goldstein et al. | 385/18 |

* cited by examiner

*Primary Examiner*—Frank G. Font
*Assistant Examiner*—Michael P. Mooney

(57) ABSTRACT

A multistage optical switching network that uses a layout that provides equidistant paths between any input port and any output port. It uses a combination of double-surface sided micromechanical movable mirrors as the switches and stationary single-surface coated stationary mirrors.

11 Claims, 2 Drawing Sheets

MICRO-OPTO MECHANICAL MULTISTAGE INTERCONNECTION SWITCH

FIELD OF THE INVENTION

This invention relates to cross-connect switches for use in optical networks and more particularly to such switches that use micromirrors as a switching element to permit the switching of optical signals directly without the need to convert them to electrical signals.

BACKGROUND OF THE INVENTION

The growing interest in optical networks for use in communication systems has led to growing interest in switching apparatus, such as cross-connect switches, that switch optical signals directly using micromirrors as the switching element. Generally these systems use flip-mirror chips arranged in a two-dimensional grid connected in crossbar style. An input collimated beam supplied to an input port by an optical fiber is guided along an optical path, typically either in free space or over a plane of silicon, until it is intercepted and reflected by a flip-chip micromirror that has been electronically activated to make a 45° angle with the input beam, after which the beam travels in a path at a 90° angle to its earlier path to an output port where it is collected by an output fiber. Such a system, for example, is described in a paper entitled "Free Space Micromachined Optical Switches with Submillisecond Switching Time for Large Scale Optical Crossconnects," *IEEE Photonics Technology Letters*, V10, 4, 1998, pp. 525–527.

The problem with this approach is that a small diameter collimated beam can travel only a limited distance before broadening. Accordingly unless the beam is relay-imaged by one or more intervening lenses, this problem limits the number of input and output ports feasible. Moreover placing a relay lens between each of the N×N flip-mirrors needed in an N×N switch introduces too much loss for large values of N, such as for the 1024×1024 switch typically required in state-of-the-art switches. Another problem is that there is considerable variation in the lengths of the various paths between the input and output ports and this complicates keeping all beams focused by interposed lenses.

SUMMARY OF THE INVENTION

The present invention is a scalable multistage interconnection switch for optical signals that uses a novel layout of switches that are micromechanical mirrors that are movable by an actuator and are designed to reflect on both surfaces, in combination with stationary mirrors that are sided on only one surface for redirecting the paths of the beams. Advantageously, there may also be included along the beam paths lenses for keeping the beams well focused. By making both surfaces reflective, as by coating, each mirror can act as a 2×2 switch as previously described in a paper entitled "High Density Connecting-Symmetric Free-Space Micromachined Polygon Optical Crossconnects with Low Loss for WDM Networks," Postdeadline Paper PD-24, *Optical Fiber Communications*, 1998, San Jose, Calif., whose teaching is incorporated herein by reference.

It is a characteristic of the novel layout that all paths between an input port and an output port are essentially of equal length, which permits the lenses to be used readily for relay imaging. Also this facilitates the location of lenses along the beam paths so that they can form beam waists where the switches are located. As a result small movements of a switch are needed to properly redirect the incident beam. Also this fact permits the lenses to be readily used for relay imaging when this is desired.

As used herein, a multistage switching network is one that includes successive layers or sets of switches such that at each layer a light beam can be switched to a new path and that generally includes $\log_2 N$ layers for an N×N switch. Such layers generally use fewer switches than do the older cross-bar switches, which reduces the total switch complexity, and also facilitates the location of lenses to keep the beam well defined.

The principles of multistage networks are described in a paper entitled "Growth, Complexity and Performance of Telephone Connecting Networks" by V. E. Benes, published in *The Bell System Technical Journal*, Vol. 62, No. 3, February 1963, pp. 499–539 and its teaching is incorporated herein by reference.

DETAILED DESCRIPTION

Figure 1:
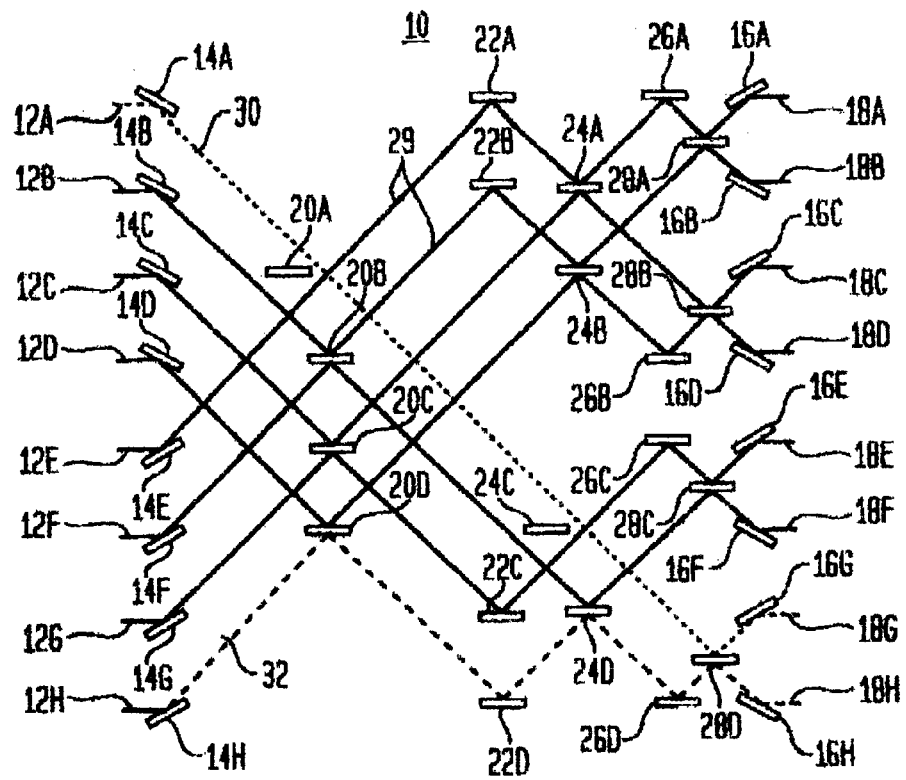
FIG. 1 shows the layout of an 8×8 switch in accordance with the invention utilizing a novel layout of movable double-sided mirrors as switches and stationary single-sided mirrors for keeping the beams appropriately directed.

FIG. 1 shows by way of example an 8×8 cross-connect switch 10 that uses the novel layout of movable and stationary mirrors and lenses characteristic of the invention. Typically, the invention would be used with larger numbers of input and output ports between which optical signals would be switched. In this switch, eight optical fibers 12A–12H, shown schematically, supply separate input beams to 8 equally spaced input ports 14A–14H each for transfer as an output beam at any one of eight equally spaced output ports 16A–16B to the output fibers 18A–18H. Available paths between the input ports and the output ports along which the beams can travel are indicated by the various straight line segments 29.

In the form depicted there is only a single unique path between a given input port and a given output port. To provide a multiplicity of paths between any input and any output port, there can be including additional sets of layers, for example by simply doubling the array by connecting the input ports of a second identical array to the output ports of the first array and using the input ports of the first array as the switch input ports and the output ports of the second array as the switch output ports, as is well known in the art.

As can be seen in FIG. 1, the top four (top half) of the paths associated initially with input ports 14A–14D are each directed downwards essentially at a 45° angle with the horizontal while the bottom four (bottom half) associated initially with the input ports 14E–14H are each similarly directed upwards at essentially a 135° angle with the horizontal. At each of the four points of intersection, the first path with the fifth path, second path with the sixth path, the third path with the seventh path and the fourth path with the eighth path, there is located a separate one of the set of double-surface coated movable mirrors 20A, 20B, 20C and 20D that serves as a 2×2 switch. The normal position, shown for each of mirrors 20B, 20C and 20D, is such that each of its two coated surfaces is oriented to make essentially a 45° angle with a different one of the two intersecting paths, in which case it changes the direction of the incident beam by 90°. In its moved position, shown for mirror 20A, a mirror is moved out of the path of each of the two paths that intersect at its normal position, so that a beam passing through such intersection continues essentially unaffected.

Further along in the continuation of each of the original third, fourth, fifth and sixth paths, unaffected by the movable mirrors, there is positioned a stationary single-surface coated mirror 22A, 22B, 22C and 22D, that is oriented to have its coated surface oriented to deflect an incident beam essentially by 90° so that an upward traveling beam is deflected to a downward traveling beam. Beyond this point, where the first and second paths intersect with the redirected fourth and third paths, respectively, and the seventh and eighth original paths intersect the sixth and fifth paths as deflected, there are located the four movable double-surface coated mirrors 24A 24B, 24C, 24D, respectively, that form a second layer of switches.

Beyond this, there are located the four stationary single-surface sided mirrors 26A, 26B, 26C and 26D, that form the second set of stationary mirrors, oriented like the earlier mentioned first set of stationary mirrors 22A, 22B, 22C and 22D to redirect incident beams essentially by 90° to change upward angular traveling beams to downward traveling beams upward. These stationary mirrors basically are oriented to confine the upward and downward travel of original paths 20A, 20B and 20G and 20H and reverse the direction of travel when each reaches the edges.

Finally, there is a third and last layer of four movable double-surface sided mirrors, 28A, 28B, 28C and 28D, positioned at the point of intersection of the unredirected eighth and redirected seventh path, the redirected fifth path, and the twice redirected third path, the once redirected fourth path, and the unredirected first path and the once redirected second path.

The dotted line 30 shows how a closed path would be formed from input port 12A to output port 18G, involving the movement of mirror switches 20A and 24C out of a switching position and reflection from the interposed mirror switch 28D.

The broken line 32 shows a closed path between input port 12H and output port 18H involving redirection by interposed mirror switch 20D, stationary mirror 22D, interposed mirror switch 24D, stationary mirror 26D, and interposed mirror switch 28D.

It can readily be appreciated that any input port can be connected by a continuous path to any output port under the control of one or more of the double-sided mirrors.

It can readily be further appreciated that the layout can be expanded to increase the number of input ports and output ports. The scaling factors that are important are that for an N×N array there are needed $log_2N$ layers of movable mirror switches, each set with N/2 movable double-sided mirror switches, and $Nlog_2-1$ sets of stationary mirrors, each with N/2 stationary single-sided mirrors.

Moreover, in large arrays it may be important to insert lenses along the beam paths for keeping the light beams from spreading undesirably.

Figure 2:
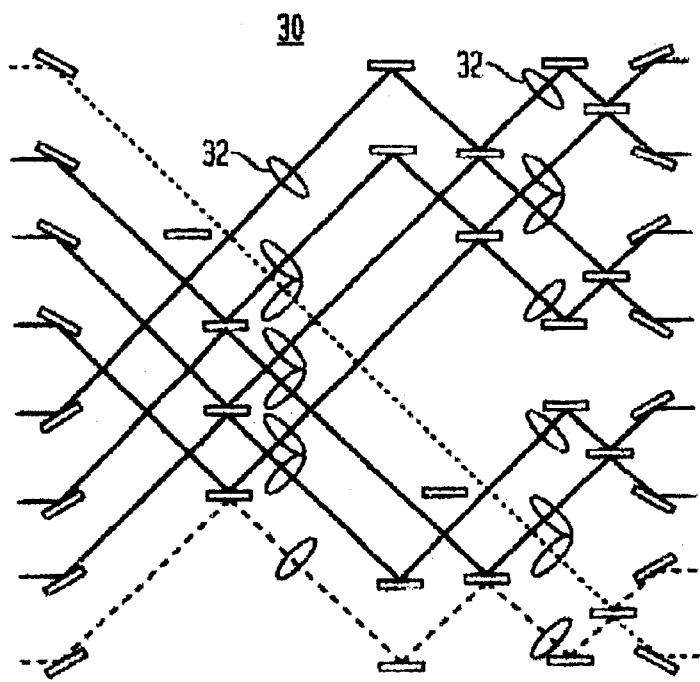
FIG. 2 shows a possible arrangement for including relay lenses along the beam paths for keeping the beams well confined.

For example, lenses may be inserted along the beam paths as needed where space permits. In the network 30 shown in FIG. 2 lenses 32 are positioned periodically to serve as relay lenses along the various paths, a role that is facilitated because all beam paths between an input port and an output port are of equal lengths.

Figure 3A:
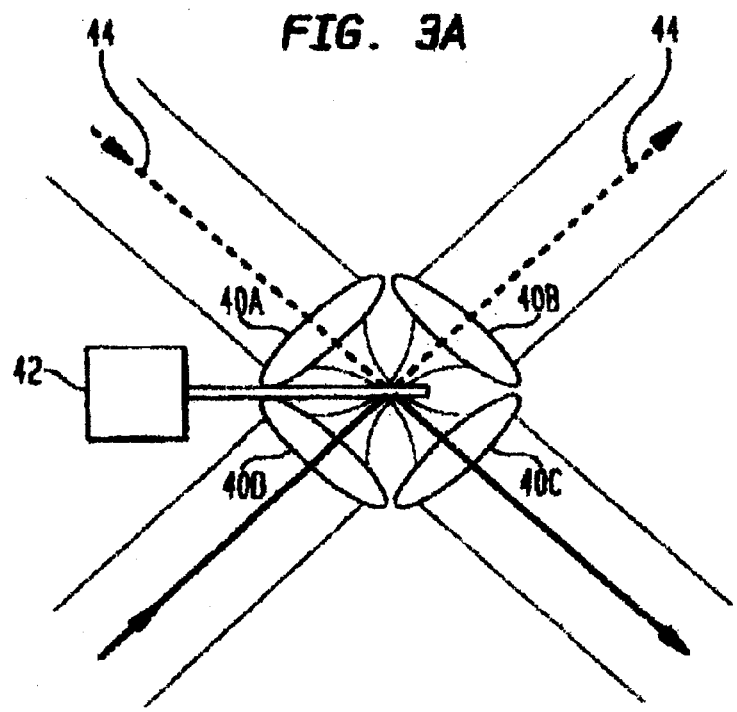
FIGS. 3A and 3B show an arrangement for including lenses along the beam paths to provide beam waists where the double-sided mirror switches are located.
Figure 3B:
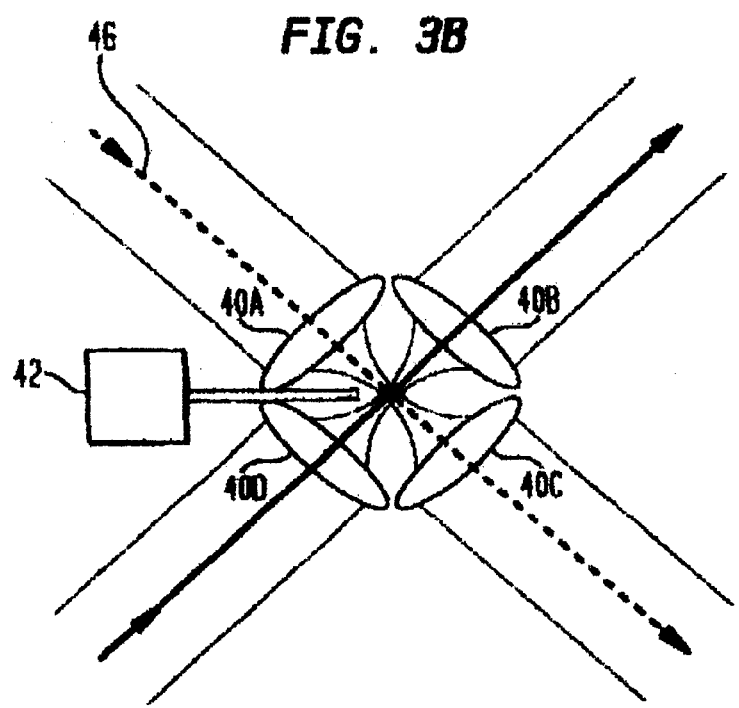

Alternatively, another arrangement for inserting the lenses is shown in FIG. 3A and 3B, where a set of four lenses 40A–40D surrounds a movable mirror switch 42, the lenses positioned and designed to insure that the beam waist is at the intersection of the two crossing paths where the movable mirror switch 42 is to be located for the interception of beams traveling towards the point of intersection.

In particular, FIG. 3A shows the mirror switch 42 in its closed position to redirect an incident beam at a 90° angle to its original path and FIG. 3B shows the mirror in the open position in which the mirror is out of the path of incidence to permit beam 44 to pass straight through. In each case there is shown how the lenses 404 first act to focus the incident beam to a narrow waist in the region where it is intercepted by a closed switch and then to collimate the defocused beam after it has passed its region of focus. By focusing the beam to a narrow waist, there is reduced the distance the mirror must move to change between the open and closed states, thereby simplifying the design of a compact micromechanical actuator to do the switching. In particular, it should be feasible to move the mirror only 20 microns to change between states. Advantageously, the lenses are aspherical lenses positioned along the beam paths and spaced from the region of intersection the focal length of the lenses. Such lenses can also be designed to act as relay lenses for keeping the beam diameter well controlled along the length of its path.

Control of the switching paths opening and closing the mirror switches is readily provided by electronic circuitry that includes a semiconductor memory to which are supplied the identities of the input port and the desired output port, in response to which there are moved appropriately the switches needed to provide an appropriate path between such input and output ports.

It is to be understood that the specific embodiment described is merely illustrative of the basic principles of the invention. As has been indicated, by the use of the principles discussed, the size of the switch can be easily scaled upwards or downwards. Moreover the various lenses for use in focusing or keeping the beam from spreading may usually be either of the refractive or diffractive type. Additionally it should be feasible to utilize the principles described in other layouts.

What is claimed is:

1. A multistage cross-connect N×N optical switch that comprises a plurality of movable double-surface mirrors and a plurality of stationary single-surface mirrors arranged to form beam paths between N input and N output parts such that by the movement of the movable mirrors in and out of the possible paths between the input and output paths a continuous beam path may be formed between any input and any output port.

2. A cross-connect switch in accordance with claim 1 in which the path between any input port and any output port is of essentially the same length.

3. A cross-connect switch in accordance with claim 1 in which there are included at least $log_2N$ sets of movable mirror switches, each set with N/2 mirror switches, and at least $log_2N-1$ sets of stationary switches, each set with N/2 switches.

4. A cross-connect switch in accordance with claim 3 in which the sets of stationary switches are interleaved between sets of movable switches.

5. A cross-connect switch in accordance with claim 4 in which each optical path between an input and an output port is of equal length.

6. A cross-connect switch in accordance with claim 1 that further includes lenses positioned along the beam paths for keeping the beam diameter relatively uniform.

7. A cross-connect switch for connecting a plurality of input ports to a plurality of output ports that comprises a plurality of movable double-surface coated mirrors and a plurality of stationary single-surface coated mirrors that are positioned to form an optical path from any input port to any output port.

8. A multistage switching network that utilizes a plurality of micromechanical movable mirrors that are designed to be reflective on both opposed surfaces and that are designed to be reflective on one surface arranged in at least $\log_2 N$ stages of the N/2 movable mirrors and at least $\log_2 N-1$ stages of N/2 stationary mirrors to form beam paths from any one of N input ports to any one of N output ports.

9. A multistage switching network that includes a plurality of double-surface micromechanical mirrors, each movable between an open and a closed state and each positioned along a beam path to a switching point, and spaced a distance from the switching point equal to its focal length for narrowing the beam waist of an incident beam at the switching point.

10. An optical switch that includes a micromechanical movable mirror that is double-surface coated and positioned adjacent a region where two light paths intersect for movement in and out of the region of intersection to redirect an incident beam and a set of four lenses disposed along intersecting paths for focusing incident light at the region of intersection.

11. An optical switch in accordance with claim 10 in the two paths are intersecting at right angles and the lenses are spherical length spaced from the region of intersection the focal length of the lenses.

* * * * *